US008150811B1

(12) United States Patent
Tarenskeen et al.

(10) Patent No.: US 8,150,811 B1
(45) Date of Patent: Apr. 3, 2012

(54) PARALLEL MIGRATION OF DATA BETWEEN SYSTEMS

(75) Inventors: Herbert J. Tarenskeen, Escondido, CA (US); Joseph Craig McPhie, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 345 days.

(21) Appl. No.: 12/465,826

(22) Filed: May 14, 2009

Related U.S. Application Data

(60) Division of application No. 09/997,442, filed on Nov. 29, 2001, now Pat. No. 7,548,898, which is a continuation-in-part of application No. 09/796,145, filed on Feb. 28, 2001, now abandoned.

(51) Int. Cl.
G06F 7/00 (2006.01)
G06F 17/00 (2006.01)
(52) U.S. Cl. ........................................ 707/659; 711/162
(58) Field of Classification Search .......... 707/600–831; 711/161, 162
See application file for complete search history.

(56) References Cited

U.S. PATENT DOCUMENTS

| 5,084,789 | A | 1/1992 | Kamo et al. ..................... 360/53 |
| 5,404,507 | A | 4/1995 | Bohm et al. .................... 707/204 |
| 5,440,727 | A | 8/1995 | Bhide et al. .................... 711/117 |
| 5,530,939 | A | 6/1996 | Mansfield et al. ............. 707/201 |
| 5,884,328 | A | 3/1999 | Mosher ........................... 707/202 |
| 5,991,771 | A | 11/1999 | Falls et al. ....................... 707/202 |
| 6,029,178 | A | 2/2000 | Martin et al. .................. 707/202 |
| 6,047,294 | A | 4/2000 | Deshayes et al. ............. 707/204 |
| 6,078,933 | A | 6/2000 | Szalwinski .................... 707/204 |
| 6,151,608 | A | 11/2000 | Abrams ........................ 707/204 |
| 6,240,427 | B1 | 5/2001 | Szalwinski et al. ........... 707/204 |
| 6,353,452 | B1 | 3/2002 | Hamada et al. ................ 715/825 |
| 6,374,262 | B1 | 4/2002 | Kodama ......................... 707/201 |
| 6,490,598 | B1 * | 12/2002 | Taylor .................................. 1/1 |
| 6,567,823 | B1 * | 5/2003 | Rothschild ............................ 1/1 |
| 6,651,074 | B1 * | 11/2003 | Taylor ............................. 707/704 |
| 7,548,898 | B1 | 6/2009 | Tarenskeen et al. ........... 707/202 |
| 2002/0161784 | A1 | 10/2002 | Tarenskeen ................... 707/202 |

OTHER PUBLICATIONS

Rajasekaret al., Collection-based persistent archives, Mar. 15-18, 1999, IEEE, 176-184.*
Kakeshita et al., The net disk architecture for dynamic load balancing among disk arrays, Jul. 4-7, 2000, IEEE, 315-322.*
Gurewich et al., Teach Yourself Database Programming with DELPHI in 21 Days 1995, 144-148.
Microsoft Press, Computer Dictionary, 67.
NCR Corporation, "Teradata® EDBMS for UNIX Migration from V1 R5.x and VR2.x to V2R3.0 For Single-Byte Character Sets." pp. i-viii, 1-1 to 3-4 (Dec. 1999).
NCR Corporation, "Teradata® Archive/Recovery Reference." pp. i-xiv, 1-2 to 5-16, Appendices A-D (Sep. 2000).
Rajasekar et al., Collection-based persistent archives, Mar. 15-18, 1999, IEEE, 176-184.

\* cited by examiner

*Primary Examiner* — Jean B Fleurantin
(74) *Attorney, Agent, or Firm* — Trop, Pruner & Hu P.C.; Randy Campbell

(57) ABSTRACT

A system and method for migrating data, in parallel, from a source database system into a target database system includes storing data in groups (e.g., clusters) in the source database system. The groups of data are transferred, in parallel, to respective temporary staging tables in the target database system. The data in the temporary staging tables are then inserted, in parallel, into a target table in the target database system to complete the migration.

9 Claims, 9 Drawing Sheets

PARALLEL MIGRATION OF DATA BETWEEN SYSTEMS

CROSS REFERENCE TO RELATED APPLICATION

This application is a divisional of U.S. Ser. No. 09/997,442, filed Nov. 29, 2001 now U.S. Pat. No. 7,548,898. U.S. Ser. No. 09/997,442 is a continuation-in-part of U.S. Ser. No. 09/796,145, filed Feb. 28, 2001 now abandoned.

TECHNICAL FIELD

The invention relates to parallel migration of data between systems.

BACKGROUND

A database is a collection of stored data that is logically related and that is accessible by one or more users. A popular type of database system is the relational database management system, which includes relational tables made up of rows and columns. Each row represents an occurrence of an entity defined by the table, with an entity being a person, place, or thing about which the table contains information.

Administrators of database systems often archive contents of the systems for various reasons. For example, archiving and restoring data are steps that occur in migrating data from one database system (the source system) to another database system (the target system).

The archive and restore procedure traditionally involves transferring data from the source database system to a storage medium such as a tape or disk. Normally, if large amounts of data (e.g., gigabytes or terabytes of data) are involved, conventional systems archive the data to tape. The archived data is then loaded from the tape onto the target database system.

The data from the source database system is backed up (archived) to the tape or disk and, and via manual operator intervention, the tape or disk is then exported from the source system and imported into the target database system. The data from the source database system, which is contained on the tape or disk, can then be restored to the target database system.

For very large database systems, higher data migration transfer speeds can be obtained by executing, concurrently and in parallel, as many of these archive/export/import/restore activities as can be supported by both systems. When transferring data between complex database systems, such as TERADATA® systems from NCR Corporation, the configurations of the source and target systems also place a constraint on parallelism of the data transfer. Some TERADATA® database systems include a plurality of nodes and access module processors (AMPs) for managing concurrent access of data. If the numbers of nodes and/or AMPs are different in the source and target database systems, then distribution of contents of the tables across the nodes and/or AMPs can be different. This may require that portions of the tables be transferred in sequence (back-to-back), which reduces parallelism and efficiency of data transfer.

Consequently, migrating large amounts of data from one system to another can take a relatively long period of time.

SUMMARY

In general, improved data migration operations are provided between systems. For example, a database system comprises a storage subsystem to store a plurality of temporary staging tables and a target table, and an access management subsystem adapted to receive, in parallel, groups of data from a source system for storage in corresponding temporary staging tables. The access management subsystem is adapted to further insert data, in parallel, from the temporary staging tables into the target table.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
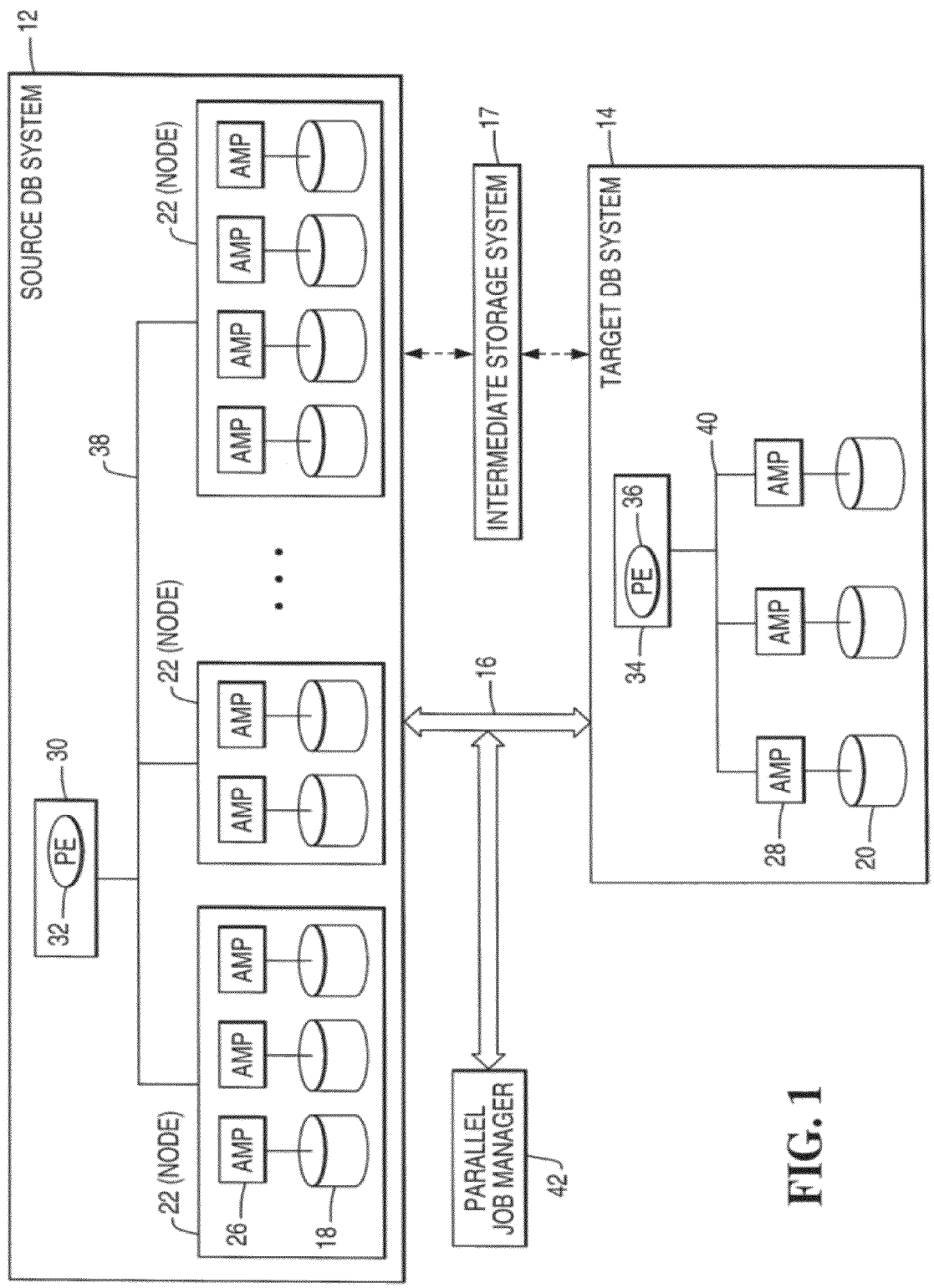
FIG. 1 is a block diagram of an embodiment of a data migration system that includes a source database system and a target database system.

FIG. 1 illustrates a source database system 12 and a target database system 14 that are interconnected by a data network 16. Examples of the data network 16 include a local area network (LAN), a wide area network (WAN), or a public network (such as the Internet). The database system 12 is designated as the source database system because, in the example of FIG. 1, data in storage modules 18 of the source database system 12 is archived. The database system 14 is designated as the target database system because archived data from the source database system is migrated to storage modules 20 in the target database system 14. If the database systems 12 and 14 are relational database management systems (RDBMS), then data is stored in relational tables in storage modules 18 and 20. A relational table includes rows (also referred to as "tuples") and columns (also referred to as "attributes").

The storage modules 18 or 20 in respective database systems 12 or 14 are implemented as hard disk drives, disk arrays, tape drives, or other magnetic, optical, or other type of media. The designation of "source database system" and "target database system" can be switched if migration of data is from the database system 14 to the database system 12.

In accordance with one embodiment of the invention, data migration occurs over the data network 16 between the source and target database systems. Alternatively, the data migration involves archiving data from the source database system 12 to an intermediate storage system 17 (e.g., tape drives, disk drives, etc.), followed by a restore of data from the intermediate storage system 17 to the target database system 14. Note that the intermediate storage system 17 is not used in some embodiments where data is transferred by a concurrent archive and restore process, as further described below.

The database system 12 includes plural nodes 22. Each node 22 includes one or plural access module processors (AMPs) 26. AMPs are software components executable in each node 22 for managing access to data contained in respective storage modules 18. The target database system 14 also includes AMPs 28. Although not shown, the AMPs 28 are also executable on respective nodes.

Each AMP 26 or 28 includes an access or database manager that creates, modifies, or deletes definitions of tables; inserts, deletes, or modifies rows within the tables; retrieves information from definitions and tables; and locks databases and tables.

To access data stored in relational tables in the storage modules 18 and 20 in respective source and target database systems 12 and 14, queries are submitted to respective parsing engines 32 and 36. In the source database system 12, the parsing engine 32 is executable in a node 30. Although only one parsing engine is shown, the database system 12 in an alternative embodiment includes plural parsing engines 32, which are also executable in nodes 22. The parsing engine(s) 32 and the AMPs 26 are interconnected by an interconnect layer 38.

Similarly, the parsing engine 36 is executable in a node 34 in the target database system 14. Alternatively, the target database system 14 can also include multiple parsing engines. The parsing engine 36 and the AMPs 28 are interconnected by an interconnect layer 40.

Upon receipt of a query, the parsing engine 32 or 36 interprets the query, checks the query for proper syntax, and sends out executable actions to be performed by the AMPs 26 or 28. In one embodiment, queries that are processed by the parsing engine 18 include queries according to a standard database query language, such as Structured Query Language (SQL). One version of SQL is the SQL-92 Standard, while another version of SQL is the SQL-99 Standard (also referred to as the SQL-3 Standard).

Also connected to the network 16 is a parallel job manager 42. Generally, the parallel job manager 42 is responsible for managing various tasks to be performed in plural nodes or by plural AMPs in the source and target database systems 12 and 14. The parallel job manager 42 is also responsible for the management of parallel data migration from the source database system 12 to the target database system 14. The parallel job manager 42 manages the creation of any necessary tables (such as temporary staging tables, discussed below) for performing parallel migration. The parallel job manager 42 also schedules tasks (e.g., launch software routines) in the source and target database systems to perform data transfers during the migration. In one embodiment, the various tasks performed by the parallel job manager 42 are performed by creating scripts. In addition, the parallel job manager 42 also generates the appropriate migration plan (e.g., script generation, runtime workload distribution, job launch, and so forth) and executes parallel steps in the correct sequence.

Figure 2:
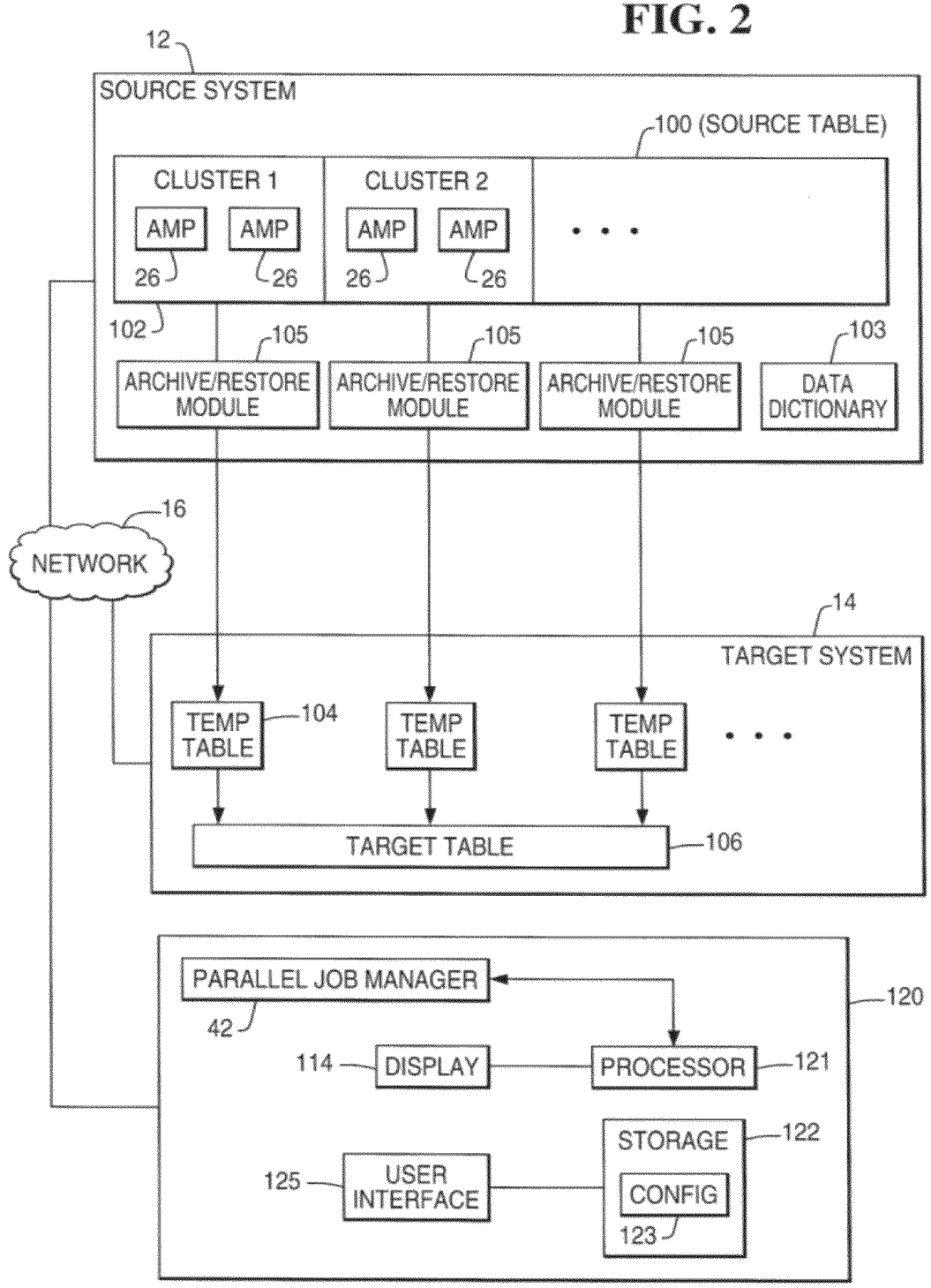
FIG. 2-4 illustrate the migration of data from a source table in the source database system to the target database system.

The parallel job manager 42 in one arrangement is a software module executable in a system separate from the database systems 12 and 14, such as a client terminal 120 coupled to the network 16 (shown in FIG. 2). Alternatively, the parallel job manager 42 is executable in one or both of the database systems 12 and 14.

As shown in FIG. 2, the client terminal 120 also includes a processor 121 on which the parallel job manager 42, scripts, and other software routines associated with the parallel job manager 42 are executable. The processor 121 is coupled to a storage 122, which stores a configuration file 123 editable by an operator and accessible by the parallel job manager 42 to perform data migration. The configuration file 123 contains control information for data migration between the source and target database systems 12 and 14. The client terminal 120 also includes a display 124 and a user interface 125 (e.g., mouse, keyboard, graphical user interface, etc.).

FIG. 2 also shows the migration of data between the source database system 12 and the target database system 14, in accordance with one embodiment. A source table 100 is stored in the source database system 12. In some embodiments, the source table 100 is a relatively large table, having a size on the order of hundreds of gigabytes and several terabytes, for example. When transferring such a large table (or multiple large tables) between database systems, conventional migration techniques can take days. On the other hand, migration techniques in accordance with some embodiments of the invention substantially reduce the migration time. For example, the migration time can be reduced from days to hours (or even less) in some cases.

In one embodiment, the source table 100 is stored by clusters 102 of AMPs 26. A cluster 102 is a group of AMPs that act as a single fallback unit. Fallback is used for protecting data within each cluster. Each row of a table stored by a first AMP is also copied to another AMP in the same cluster. If the first AMP fails, then the system can access the fallback row in the second AMP so that database system operations can continue despite failure of the first AMP. Generally, AMPs in each cluster are from different nodes. Thus, if one node in the database system fails, then data access can continue by using fallback in each of multiple clusters.

Although reference is made to clusters in the described examples, the invention is not to be limited in scope to migration techniques that involve clustering. In other embodiments, other groupings of data can be used.

Definitions about the source table 100 are stored in a data dictionary 103. The data dictionary includes one or more system tables containing definitions of all objects in the database system. The information contained in the data dictionary 103 is "data about data" or "metadata." Examples of information contained in the data dictionary 103 include information pertaining to characteristics of each table in the database, including column names, the data type for each column, the primary key, and indexes defined on each table. Other information includes information pertaining to whether fallback is used, the owner of the table, the creator of the table, associated privileges per user, journaling definitions for rollback/rollforward-type operations, and other information.

Archive/restore module instances 105 are launched (under control of the parallel job manager 42) in the source database system 12. Each archive/restore module instance 105 controls the archiving of data from the source table 100 and the restore of the data to the target database system 14. The number of archive/restore module instances 105 that are launched is specified in the configuration file 123.

The specified number of archive/restore module instances 105 is based on the software/hardware arrangements of the source and target database systems. For example, the number of network ports present on the nodes of the source and target database systems can control the number of network connections between the source and target database systems, and thus the possible number of concurrent data transfer streams between the source and target database systems. For example, if there are 40 separate network connections between the source and database systems, then 40 archive/restore module instances 105 can be executed to concurrently transfer migration data across the 40 network connections.

When migrating data from the source table 100 in the source database system 12 to the target database system 14, each archive/restore module instance 105 transfers (archives and restores) data from a cluster 102 to a respective one of plural temporary staging tables (referred to as "TempTable") 104 in the target database system 14. The temporary staging tables 104 are used to temporarily store the migration data as the migration data is being transferred from the source database system 12 to the target database system 14. Once the data from the source table 100 has been transferred to the temporary staging tables 104, a merge request is issued by the parallel job manager 42 to the target database system 14 to write data from the temporary staging tables 104 into a target table 106.

Each staging table 104 is used to temporarily store data from a respective cluster 102 in the source database system 12. In one embodiment, there is a predefined relationship of clusters 102 to the staging tables 104. For example, there can be a one-to-one relationship between one cluster and one staging table. Alternatively, multiple clusters can be assigned to one staging table. Thus, for example, clusters 0 and 1 are assigned to a first temporary and unique staging table, clusters 2 and 3 are assigned to a second temporary and unique staging table, and so forth.

The staging tables 104 are useful when the configurations of the source database system 12 and target database system 14 are different. For example, the source database system 12 may have more or less AMPs than the target database system 14. As a result of the different configurations, distribution of a table across the AMPs will differ. For example, if a database system has M AMPs, then a table is distributed as evenly as possible across the M AMPs. If another database system has N AMPs (M#N), then the same table is distributed across N AMPs. The distributions of the table across different numbers of AMPs are thus different.

Conventionally, in some database systems, differing configurations of the source and target database systems prevent the parallel migration of clusters of data. In some conventional systems, the migration of the clusters is performed in sequence (instead of in parallel), resulting in use of only one data stream (e.g., network connection) from source to target system even though many parallel data streams (e.g., network connections) are available, which slows down the migration process. To enable the parallel migration of data via optimal usage of all available data streams (e.g., network connections) despite different configurations of the source and target database systems, the temporary staging tables 104 are used as buffers to directly receive the data from respective sets (one or more) of clusters 102. In other words, data is migrated (in parallel) from sets of one or plural clusters to respective staging tables 104. Data in the staging tables 104 is next inserted, in parallel, into the target table 106, which takes advantage of the parallelism of the target database system 14.

In some cases, once the data has been migrated from the source system to the temporary staging tables, all the rows are already properly distributed to the AMPs that they are assigned to. A re-distribution of these rows in the final merge phase is therefore not required. When all rows from the temporary staging tables are inserted into a corresponding portion of the target table, each AMP is executing the insert in parallel and the rows the AMP is inserting are already properly distributed. As a result, no redistribution takes place in the final merge phase from the temporary staging tables to the target table. Such an operation is referred to as "an AMP local operation" in which each AMP is doing the insert in parallel, taking advantage of the parallel architecture of the database system, which is a TERADATA® parallel system in one example embodiment. In this arrangement, each temporary staging table has an uneven distribution of the rows in which only those AMPs that are assigned the rows are populated but other AMPs may have significantly less or zero rows. However, the rows in all the temporary staging tables are evenly distributed and cover all AMPs so when the insert operation is executed all AMPs are isolated and working in parallel to do the insert from the temporary staging tables to the target table.

Figure 3:
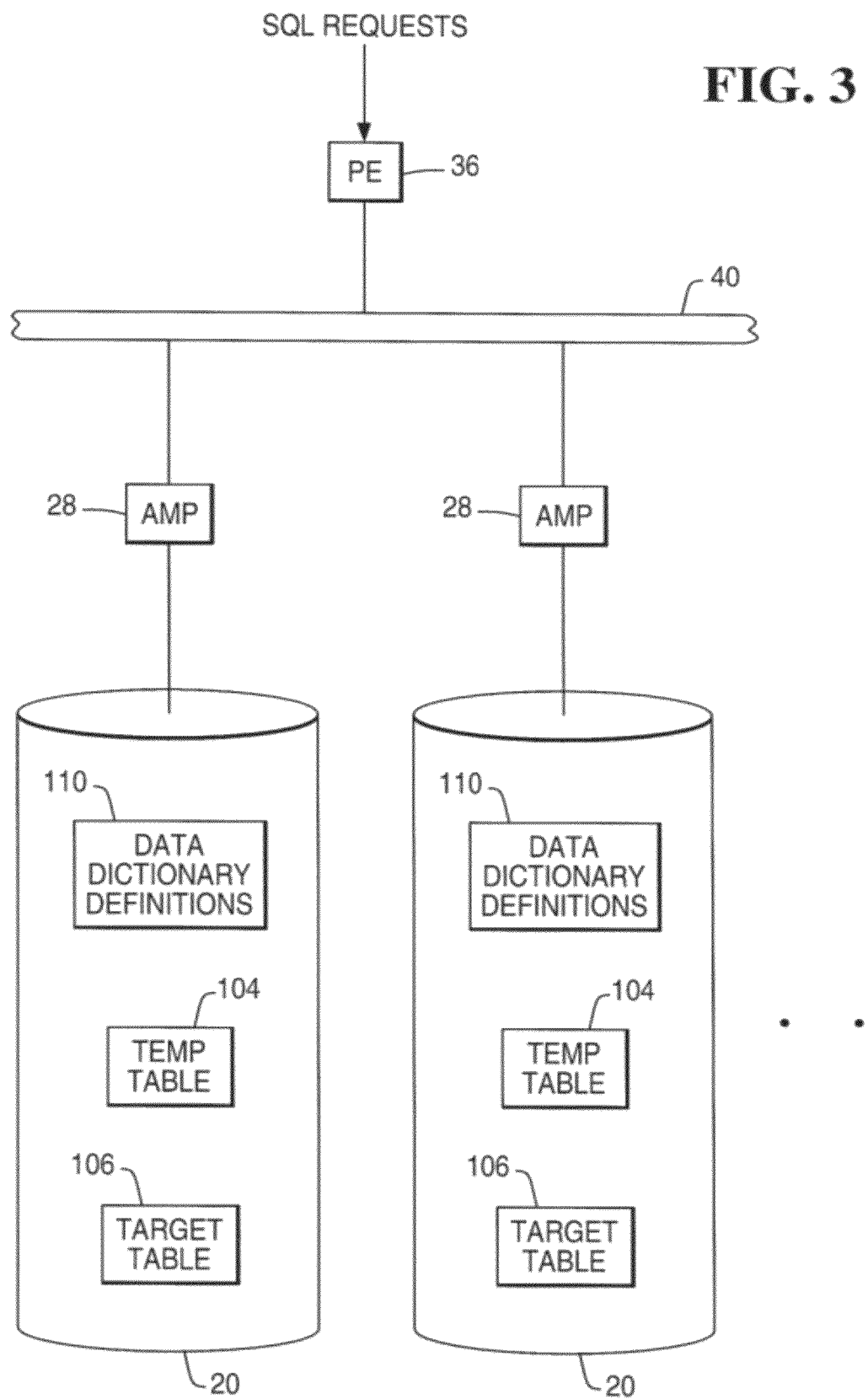

As shown in FIG. 3, staging tables TempTable 104 are distributed across the storage modules 20 in the target database system 14. The target table 106 is also distributed across the storage modules 20. Note that the number of staging tables 104 is not necessarily the same as the number of storage modules 20. The number of staging tables 104 created depends on the number of concurrent archive/restore module instances 105 running in the source database system 12. The number of storage modules 20 depends on the number of AMPs 28 in the target database system 14.

In addition, data dictionary definitions 110 are created in the target database system 14. The data dictionary definitions 110 are either stored in one storage module 20 or distributed across the storage modules 20. In creating the staging tables 104, the parallel job manager 42 first copies the data dictionary definition in the data dictionary 103 from the source database system 12 to the target database system 14. Using the copied definitions to create the staging tables 104, the characteristics of the staging tables 104 are defined identically as those of the source table 100. Thus, the staging tables 104 have the same columns, primary key, indexes, fallback or non-fallback definitions, and so forth, as the source table 100. This allows the concurrent transfer of data directly from each set of one or more clusters 102 of the source table 100 into a corresponding staging table 104. Other source table 100 definitions, such as information pertaining to owner, creator, privileges per user, and other information, are not necessarily associated with the staging tables 104.

Figure 4:
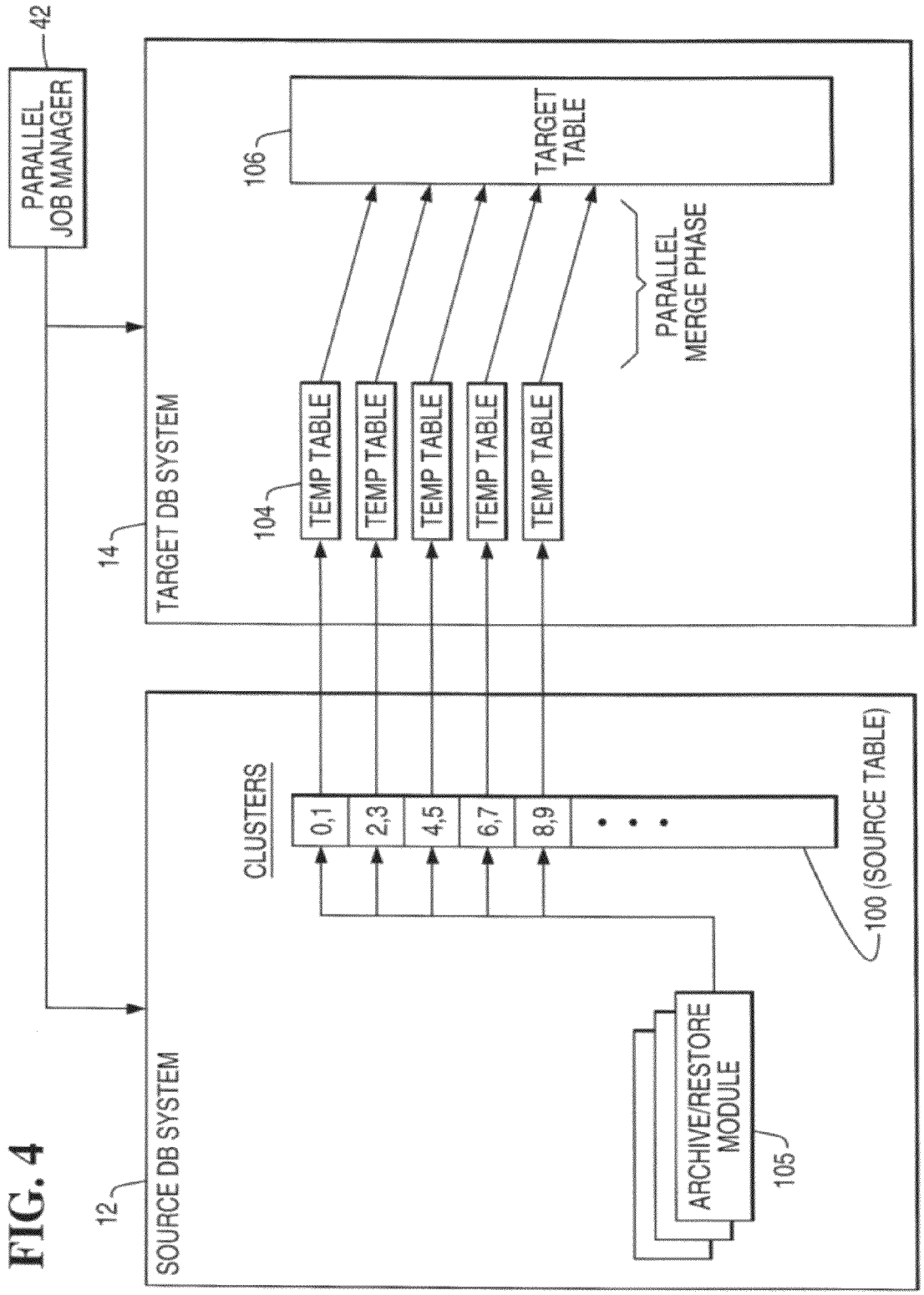

In another arrangement, as shown in FIG. 4, each staging table 104 is used to receive data of multiple clusters. Thus, as an example, the source table 100 is divided into sets of two clusters each. Thus, a first set 140 includes clusters 0 and 1, a second set 140 includes clusters 2 and 3, and so forth. Parallel archive/restore module instances 105 are executable in the source database system 12 to transfer data from each set 140 to a respective staging table 104. The parallel merge phase is then performed to merge the data in the staging tables 104 into the target table 106. Note that the parallel archive/restore module instances 105 are executed in the target database system 14 in an alternative embodiment.

Figure 5:
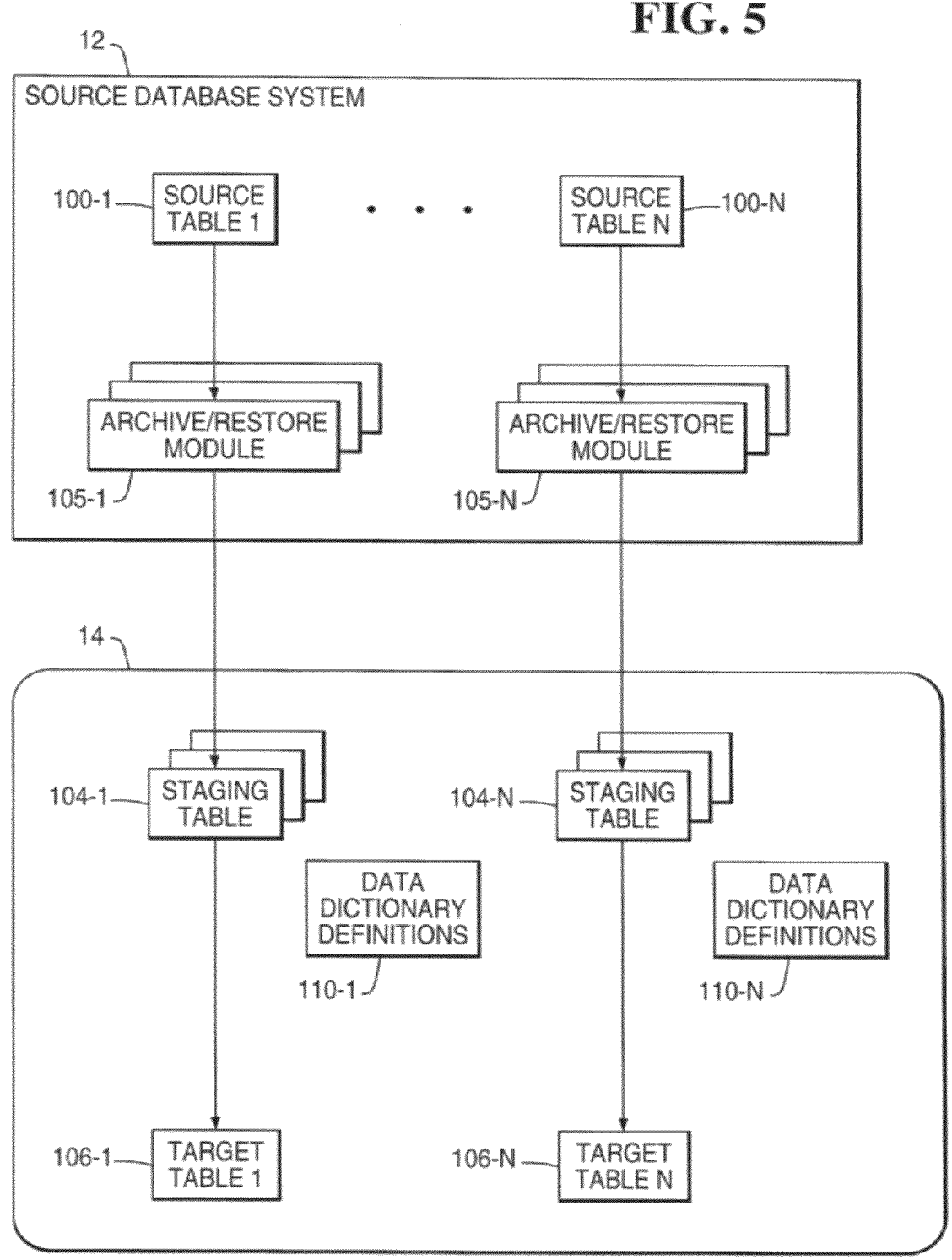
FIG. 5 illustrates the migration of data from plural source tables in the source database system to the target database system.

The source tables in the source database system 12 to migrate to respective target tables in the target database system 14 are specified in the configuration file 123, which is accessible by the parallel job manager 42. For example, as shown in FIG. 5, the source database system 12 includes two or more source tables 100_1, 100_N that have been selected for migration. To perform the data migration, a first set of archive/restore module instances 105_1, and a second set of archive/restore module instances 105_N are launched in the source database system 12.

Also, respective sets of staging tables 104_1, 104_N are created in the target database system 14, with each set corresponding to a respective one of the source tables 100_1, 100_N. The staging tables 104_1 are defined according to data dictionary definitions 110_1, which are copied definitions for the source table 100_1. Similarly, the staging tables 104_N are defined according to data dictionary definitions 110_N, which are copied definitions for the source table 100_N.

Each set of archive/restore module instances (one of 105_1, 105_N) then transfers the data from respective clusters of source table (one of 100_1, 100_N) to the corresponding set of staging tables (one of 104_1, 104_N). Subsequently, data from the staging tables are merged into the target table (one of 106_1, 106_N).

In another embodiment, instead of launching multiple sets of archive/restore module instances 105_1, 105_N to perform the migration of multiple source tables, only a single set of archive/restore module instances are launched. In this embodiment, each archive/restore module instance is assigned a unique cluster (or set of clusters) for all source tables. Also, one archive/restore module instance is assigned per network connection. The archive/restore module instances are run in parallel to perform the migration, with the migration of the different tables performed back-to-back (or in sequence). In other words, the archive/restore module instances migrate, in parallel, clusters of a first table, followed by a migration of clusters of a second table, and so forth. One benefit offered by this embodiment is that the archive/restore module instances do not have to contend for network connection bandwidth with other archive/restore module instances.

Figure 6:
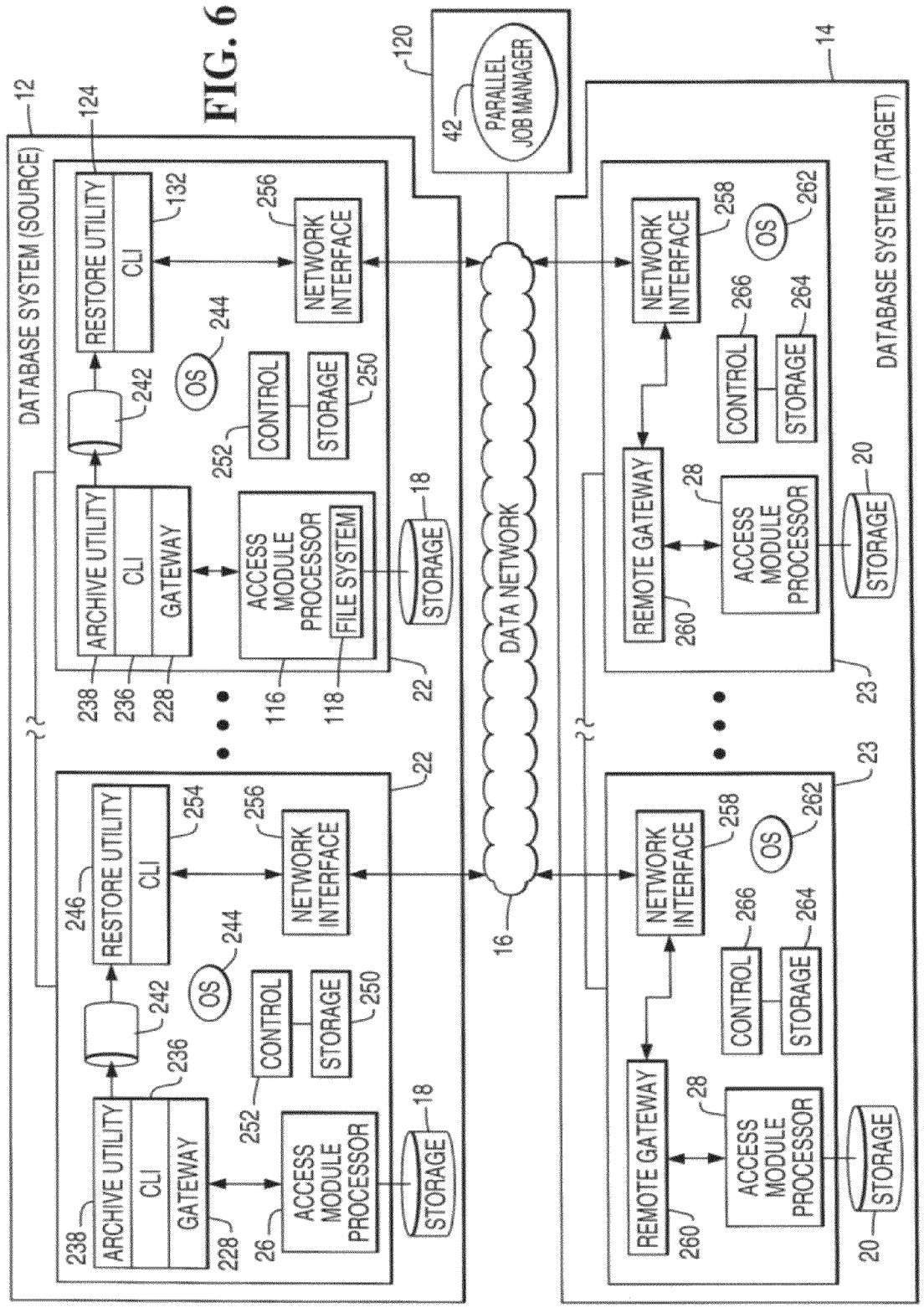
FIG. 6 is a block diagram of components of a source database system and a target database system, in accordance with one embodiment.

In accordance with some embodiments of the invention, the archive/restore module instances 105 shown in FIGS. 3-5 are part of a concurrent archive and restore mechanism in the source database system 12. Generally, the concurrent archive and restore mechanism involves the concurrent execution of an archive process and a restore process, with a relatively fast transfer medium defined between the archive and restore processes. Each pair of an archive process and restore process makes up one of the archive/restore instances 105. The archive process includes an archive utility module 238, and the restore process includes a restore utility module 246, as shown in FIG. 6.

Each node 22 in the source database system 12 includes a gateway 228 (designated as the local gateway). The gateway 228 generally manages communications between a utility or application, such as the archive utility module 238, and the database software (including the one or more AMPs 26). In one embodiment, the gateway 228 establishes and manages sessions (in response to a number of sessions specified by a user) during which the one or more AMPs 26 perform database access operations for the utility or application. A directive, such as one issued by the parallel job manager 42, can indicate if all or a subset of AMPs 26 are selected for communication with the utility or application in each node 22.

The archive utility module 238 issues archive requests to the AMPs 26 through a call level interface (CLI) application programming interface (API) 236. The archive utility module 238 includes an input/output (I/O) layer that is capable of communicating with a transfer medium 242.

In one embodiment, the node 22 runs a UNIX operating system (OS) 244. Alternatively, other types of operating systems can be employed in the node 22. In an embodiment in which the operating system is a UNIX operating system, the archive utility module 238 is a UNIX process, as are other software components in the node 22. The node 22 also includes the restore utility module 246, which contains an I/O layer for communicating with the transfer medium 242.

In one embodiment, the transfer medium 242 is a UNIX pipe, which is a file type defined in a UNIX system. A pipe allows the transfer of data between UNIX processes in a first-in-first-out (FIFO) manner. There are currently two kinds of UNIX pipes: a named pipe and an un-named pipe. A named pipe and an un-named pipe are similar except for the manner in which they are initialized and how processes can access the pipe. A writer process (such as the archive utility module 238) writes into one end of a pipe and a reader process (such as the restore utility module 246) reads from the other end of the pipe. There can be greater than one writer and reader of a pipe. In the following description, it is assumed that the operating system 244 is a UNIX operating system and that the archive and restore utility modules 238 and 246 are UNIX processes. In other types of systems, other types of operating systems and processes, threads, or execution entities can be employed.

In another embodiment, the transfer medium 242 includes a buffer, such as a buffer allocated in a memory 250 of the node 22. In yet another embodiment, the transfer medium 242 includes a shared memory accessible by plural processes.

The archive utility module 238 converts data retrieved from the storage module 18 into archive blocks of data, which are then written through its I/O layer to the pipe 242. The restore utility module 246 receives the blocks of data from the pipe 242 through its I/O layer. In one embodiment, the archive utility module 238 and restore utility module 246 are different instantiations of the same software code. Different input strings are provided during different instantiations of the software code to cause one instance to behave as an archive process while another instance behaves as a restore process.

The restore utility module 246 outputs the restored data through a CLI 254, a network interface 256, and the data network 16 to the target database system 14. The network interface 256 includes various layers to enable communications over the network 16. For example, the layers include physical and data link layers, which can be in the form of a network adapter (e.g., an Ethernet adapter). Also, in one example, the layers include an Internet Protocol (IP) and Transmission Control Protocol (TCP) or User Datagram Protocol (UDP) stack. One version of IP is described in Request for Comments (RFC) 791, entitled "Internet Protocol," dated September 1981; and another version is described in RFC 2460, entitled "Internet Protocol, Version 6 (IPv6) Specification" dated December 1998. TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network.

In the target database system 14, each node 23 also includes a network interface 258 that is coupled to the data network 16. The network interface 258 includes the same or similar layers as the network interface 256. In addition, a gateway 260 (designated as the remote gateway) resides in the node 23. The remote gateway 260 provides functions that are similar to those of the local gateway 324 in the source database system 12. The remote gateway 260 receives restored data from the restore utility module 246 through the network interface 258. The remote gateway 260 then provides the data to the AMP 28, which writes the data into the storage modules 20.

An operating system 262 also resides in the node 23. In one example, the operating system 262 is a UNIX operating system, although other types of operating systems can be employed in further embodiments. The various software components of the node 23 are executable on a control unit 266, which is coupled to a memory 264 for storing data and instructions. Similarly, in the node 22 of the source database system 12, software components are executable on a control unit 252, which is coupled to the memory 250.

By transferring data through a pipe created or defined by the archive utility 238 and managed by the operating system 244, high data transfer rates can be accomplished between the archive and restore utility modules 238 and 246. This is due to the fact that the pipe is defined in the main memory of the node. Consequently, data transfers to a disk or other relatively slow storage device can be avoided. Another benefit offered by the pipe 242 is that the archive and restore utility modules 238 and 246 can be run concurrently (with one writing archive data into the pipe 242 and the other reading the archive data from the pipe 242 for output through the network interface 256 to the target database system 14). The archive and restore utilities are run concurrently as separate processes or threads to enable the concurrency of execution The parallel job manager 42 manages the parallel archive and restore mechanism described above. The parallel job manager 42 divides the archive and restore job into separate portions for execution by the plural archive and restore modules to balance the workload.

Figure 7:
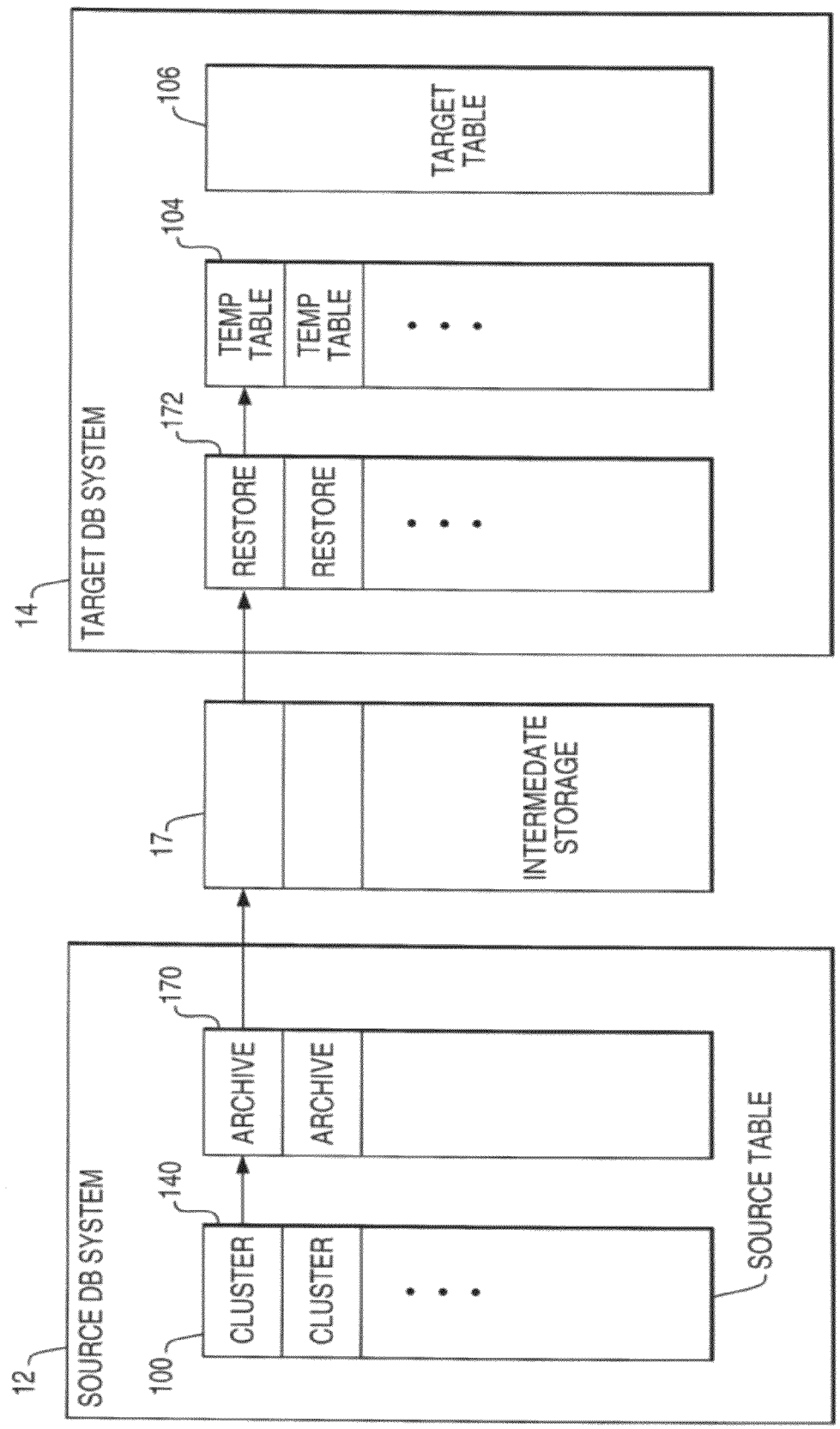
FIG. 7 illustrates the migration of data from a source database system to a target database system that involves an intermediate storage system.

FIG. 7 shows an alternative data migration procedure between the source and target database systems 12 and 14. In this arrangement, data from the source table 100 is first archived to the intermediate storage system 17. Plural archive module instances 170 are executable in the source database system 12 to archive data from respective clusters of the source table 100 to respective segments of the intermediate storage system 17.

Restore module instances 172 are executable in the target database system 14 to restore data from respective segments of the intermediate storage system into respective staging tables 104. Note, that in this arrangement, the archiving of data is first performed into the intermediate storage system 17, followed by the restoring of data from the intermediate storage system 17 into the staging tables 104. This is compared with the concurrent archive and restore mechanism used in the embodiment of FIGS. 2-6, in which the archive and restore processes can concurrently proceed.

After data has been restored into the staging tables 104, the rows of the staging tables 104 are inserted into the target table 106.

Figure 8:
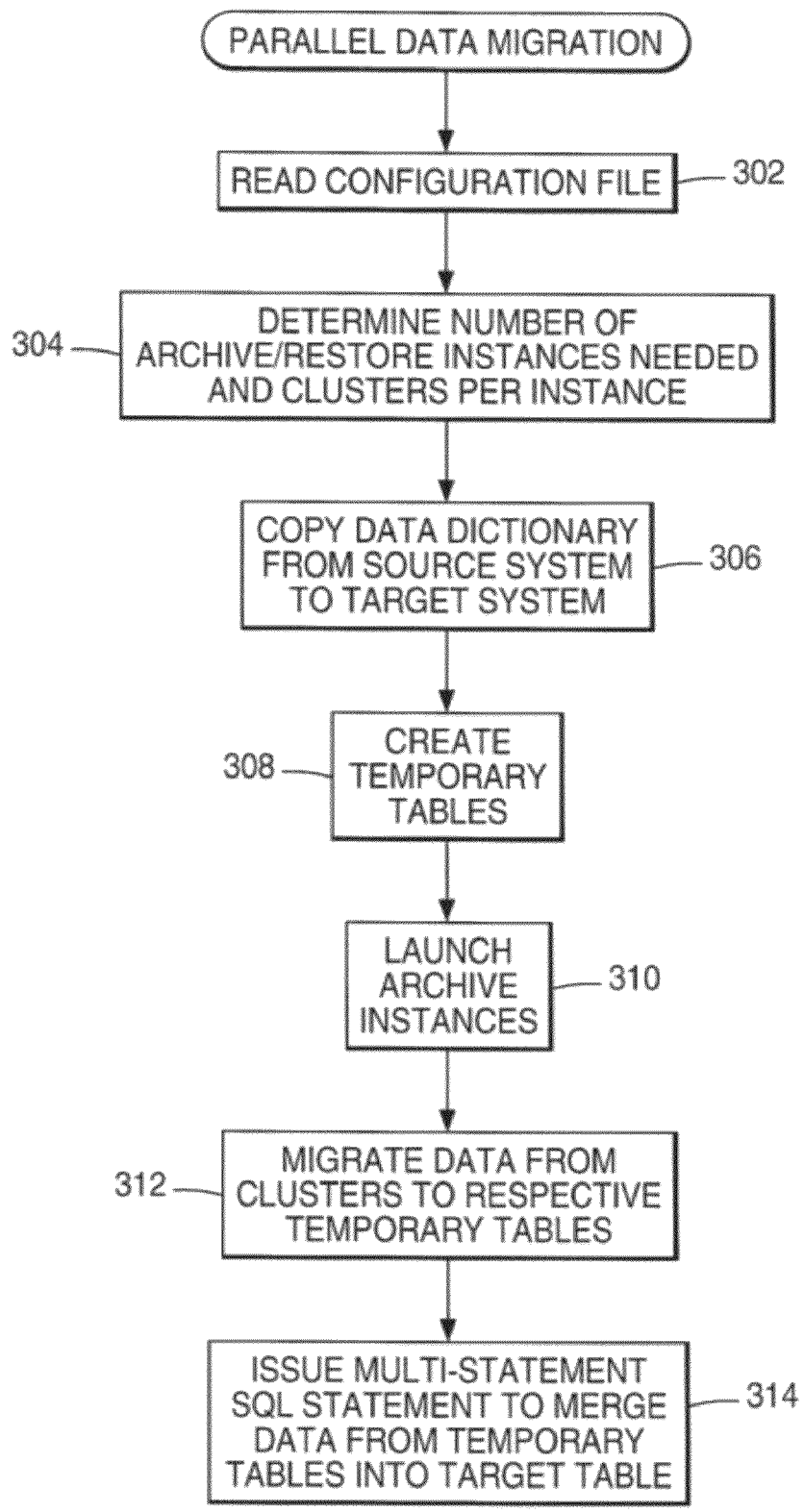
FIG. 8 is a flow diagram of a parallel data migration procedure.

FIG. 8 shows the flow of a process of migrating data from the source database system 12 to the target database system 14. The parallel job manager 42 first reads (at 304) the configuration file 123 in the client terminal 120 (FIG. 2). The configuration file 123 contains control information pertaining to what source tables to migrate, the number of archive/restore module instances to launch, the number of clusters per archive/restore module instances, names of the temporary staging tables, and other information. Next, using the accessed information in the configuration file 123, the parallel job manger 42 determines (at 302) the number of archive/restore module instances to run and number of clusters per archive/restore module instance.

Definitions in the data dictionary 103 in the source database system 12 are then copied (at 306) from the source database system 12 to the target database system 14. Using the data dictionary definitions (110 in FIG. 3), the staging tables 104 are created (at 308) by using SQL CREATE TABLE statements submitted by the parallel job manager 42. Once the staging tables 104 are created in the target database system 14, the parallel job manager 42 launches (at 310) the parallel archive/restore module instances 105 in the source database system 12. The archive/restore module instances 105 archive (at 312) the data from the clusters of the source table 100. Simultaneously (if the concurrent archive and restore mechanism is used), the archived data is restored to the staging tables 104 in the target database system 14. Once all data has been transferred into the staging tables 104, the parallel job manager 42 issues (at 314) an SQL INSERT statement to select all rows from the staging tables 104 to insert into the target table 106. An example INSERT statement is as follows:

INSERT INTO TARGETTABLE
SELECT * FROM TEMPTABLE(S)

The insert operation is performed in parallel by the AMPs 28 (FIG. 1) in the target database system 14. Note that, in one embodiment, a single "multi-statement" SQL INSERT/SELECT statement is generated. This provides that the target table is considered an empty table when the merge operation starts, which causes the database system to optimize this SQL statement such that there will not be additional processing and disk I/O overhead associated with non-empty tables, which may occur if separate multiple SQL INSERT/SELECT statements (one per temporary staging table) are used. The additional processing and overhead includes transient journaling, in which housekeeping information is kept during the operation to allow the transaction to be backed out (rolled back) in the event the transaction does not complete successfully. By doing the merge with a single SQL statement, the database system knows that the table at the start of the operation is empty, so no such housekeeping data is needed or kept. If the transaction fails, the table is still left empty with no rollbacks required.

Figure 9:
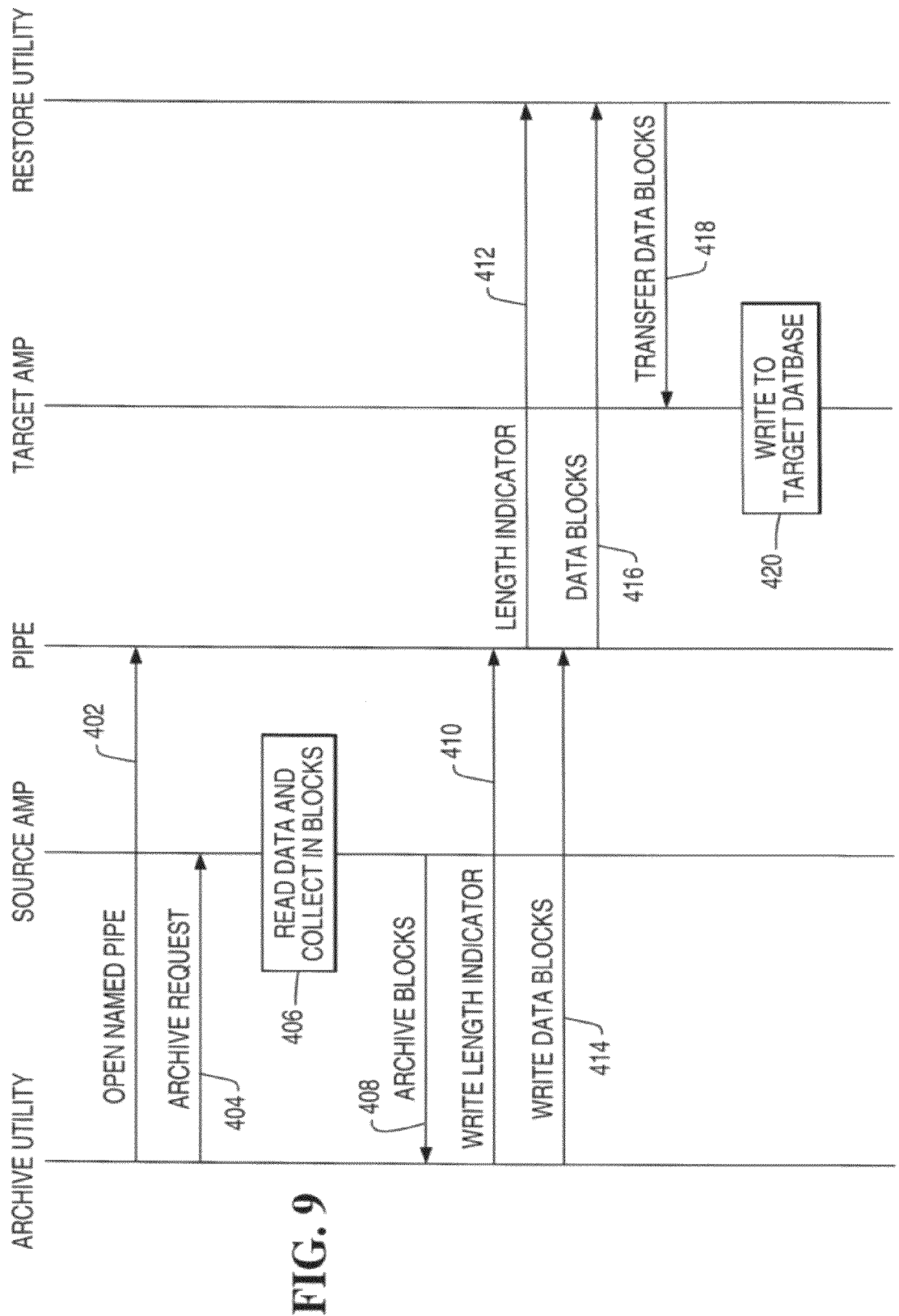
FIG. 9 is a message flow diagram of a procedure performed in migrating data from a source database system to a target database system.

FIG. 9 illustrates, in greater detail, messages exchanged between various entities involved in the migration of data from a source database system to a target database system using the concurrent archive and restore mechanism of FIG. 6.

An archive operation is started in response to a directive, such as from the parallel job manager 42 (FIG. 1). In response to the archive directive, the archive utility module is instantiated followed by instantiation of the restore utility module. The archive utility module opens (at 402) a pipe, which as discussed above is used for the transfer of data between the archive utility module and the restore utility module. In creating a pipe in the UNIX operating system, according to one example, a file descriptor for reading from the pipe and another file descriptor for writing to the pipe are created. The file descriptors enable the archive utility and restore utility modules to write to and read from, respectively, the pipe.

After the pipe has been created, the archive utility module sends (at 404) an archive request, in a defined session, to the source AMP. Although a single AMP is described in this example, it is noted that plural AMPs may be involved. The request contains a table identifier to identify the source table that is to be archived. Upon receiving the archive request, the source AMP recognizes the database access operation as an archive operation. The source AMP then reads (at 406) data from the source table and collects the data into parcels, with each parcel varying in size, up to a predetermined maximum size.

The archive data parcels (including data, table definitions, and other information) are transferred (at 408) from the source AMP to the archive utility module. The archive utility module then writes (at 410) a length indicator to the pipe. The length indicator contains a value that indicates the amount of archive data that is to be transferred to the restore utility module. The parcels are encapsulated in datablocks and transferred through the pipe. In one example, a length indicator is sent before each datablock so that the restore utility module will know how much data is in the next datablock. The length indicator can also specify an end-of-data indication to terminate the data transfer.

Once the restore utility module is instantiated, it continuously monitors the pipe for data from the archive utility module. When the restore utility module detects (at 412) the length indicator (which has a header with a special flag), the restore utility module knows that archive datablocks are going to be coming over the pipe. The archive utility module writes (at 414) datablocks to the pipe, with the restore utility module reading the datablocks (at 416) from the pipe. The restore utility unblocks and unpacks the received datablocks into parcels for communication to the target access module processor.

In one embodiment, writing and reading is done in a "streaming" fashion, with the archive utility continuously writing to the pipe (as long as the pipe has not filled up), and the restore utility module continuously reading from the pipe. More generally, the pipe is one example of a transfer medium that communicates data in a stream, with the archive module writing data to one end of the stream and the restore module reading from another end of the stream. In some embodiments, the transfer medium is implemented with high-speed, volatile storage devices (such as integrated circuit or semiconductor memory devices), which are typically used for the main memory of most computer systems.

Both the archive utility module and the restore utility modules are active concurrently in performing the archive and restore operation. The terms "continuously" or "concurrently" as used here does not require that the archive and restore utility modules must both be writing and reading, respectively, at exactly the same time to and from the pipe. The archive and restore utility modules can actually access the pipe or other transfer medium in a time-shared manner. The significant aspect of some embodiments is that the archive and restore utility modules are both active to enhance data transfer efficiency.

The restore utility module then transfers (at 418) the parcels received from the pipe to the target AMP. Next, the target AMP writes (at 420) the rows contained in each parcel to the respective staging table in the target database system. When the archive operation is complete, the archive utility writes an end-of-data indicator to the pipe, which is subsequently read by the restore utility. Both archive and restore utilities then shut down and terminate.

The various systems discussed each includes various software routines or modules (such as the parallel job manager 42, AMPs, and others). Such software routines or modules are executable on corresponding control units or processors. Each control unit or processor includes a microprocessor, a microcontroller, a processor module (including one or more microprocessors or microcontrollers), or other control or computing devices. As used here, a "controller" refers to a hardware component, software component, or a combination of the two. "Controller" can also refer to plural components (software, hardware, or a combination thereof).

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the various systems are stored in respective storage devices. The instructions when executed by a respective control unit cause the corresponding system to perform programmed acts.

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A target database system comprising:
    a memory device adapted to store a storage subsystem, the storage subsystem adapted to store a plurality of temporary tables and a target table;
    a processor in communication with the memory device; and
    an access management subsystem executable on the processor, the access management subsystem adapted to receive, in parallel, groups of data from a source database system for storage in corresponding temporary tables, the access management subsystem adapted to further insert data from the temporary tables into the target table and to make data in the target table available for execution of database queries against that data.

2. The database system of claim 1, wherein the access management system comprises plural access managers adapted to manage access of respective portions of the storage subsystem.

3. The database system of claim 2, wherein the temporary tables are defined according to definitions for a source table in the source system.

4. The database system of claim 2, wherein the plural access managers are adapted to insert data from the temporary tables in parallel to the target table.

5. The database system of claim 4, the storage subsystem adapted to store the definitions for the source table copied from the source system.

6. The database system of claim 2, wherein the plural access managers comprise access module processors, the storage subsystem divided into plural storage modules managed by respective access module processors.

7. The database system of claim 6, wherein the target table is distributed across the plural storage modules.

8. The database system of claim 1, wherein the temporary tables are relational tables.

9. The database system of claim 1, wherein the access management subsystem has a configuration different from a configuration of an access management system in the source system.

* * * * *